United States Patent [19]

Sakashita et al.

[11] Patent Number: 5,371,170

[45] Date of Patent: Dec. 6, 1994

[54] POLYCARBONATE PRODUCTION METHOD

[75] Inventors: Takeshi Sakashita; Tomoaki Shimoda, both of Iwakuni, Japan

[73] Assignee: GE Plastics Japan, Tokyo, Japan

[21] Appl. No.: 200,341

[22] Filed: Feb. 23, 1994

Related U.S. Application Data

[62] Division of Ser. No. 903,320, Jun. 24, 1992, Pat. No. 5,306,801.

[30] Foreign Application Priority Data

Jun. 28, 1991 [JP] Japan ................ 3-159144

[51] Int. Cl.$^5$ .............................................. C08G 64/00
[52] U.S. Cl. .................................... 528/198; 524/158; 524/165; 524/745; 524/746; 528/487
[58] Field of Search ............... 524/158, 165, 745, 746; 528/198, 487

[56] References Cited

U.S. PATENT DOCUMENTS 3,489,716  1/1970  Calkins .................. 524/109

FOREIGN PATENT DOCUMENTS

| 0360578 | 3/1990 | European Pat. Off. . |
| 0435124 | 7/1991 | European Pat. Off. . |
| 3041298 | 5/1981 | Germany . |
| 89-361759 | 4/1989 | Japan . |

*Primary Examiner*—John Kight, III
*Assistant Examiner*—Terressa M. Mosley

[57] ABSTRACT

Polycarbonates are prepared by inducing the melt polycondensation of an aromatic dihydroxy compound and a diester carbonate in the presence of alkali metal compounds and/or alkaline earth metal compound droxy and adding to the polycarbonate which is the reaction product thereof: a sulfonic acid compound having the formula

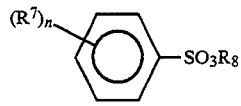

in an amount to 0.05–10 ppm, based on the polycarbonate, and also an epoxy compound in an amount of 1–2000 ppm, based on the polycarbonate.

4 Claims, No Drawings

POLYCARBONATE PRODUCTION METHOD

This is a divisional of co-pending application Ser. No. 07/903,320 filed on Jun. 24, 1992, now U.S. Pat. No. 5,306,801.

[DETAILED DESCRIPTION OF THE INVENTION]

[Field of the Invention]

The present invention relates to a polycarbonate production method. More specifically, it relates to a polycarbonate production method that is capable of preparing polycarbonates which have excellent residence stability such as hue stability and heat stability at the time of molding, and which have particularly outstanding water resistance.

[TECHNICAL BACKGROUND OF THE INVENTION]

Polycarbonates have excellent mechanical properties such as impact resistance, as well as excellent heat resistance, transparency and other properties. They are widely used in applications such as various types of mechanical components, optical disks, and automotive parts.

Polycarbonates such as these have hitherto been prepared by a method involving the direct reaction of an aromatic dihydroxy compound such as bispherol A with phosgene (interfacial process) or a method involving the transesterification of an aromatic dihydroxy compound and a diester carbonate (melt process).

Of these two methods, the melt process has the advantage of being able to prepare polycarbonates more inexpensively than the interfacial process. Moreover, because it does not use toxic substances such as phosgene, it is also desirable from the standpoint of environmental health.

In polycarbonate production methods by prior-art melt processes, alkali metal compounds, alkaline earth metal compounds or the like are generally used as the catalyst in an amount of $10^{-3}$ to $10^{-6}$ mole per mole of the aromatic dihydroxy compound.

However, polycarbonates obtained using an amount of catalyst such as this have a poor residence stability. That is, when the polycarbonate is melt-molded, some of it will at times undergo thermal decomposition, a decline in molecular weight, discoloration, and a decrease in transparency.

For example, Japanese Published Examined Patent Application [Kokoku] No. 54-44,303 (1979) discloses a method for obtaining polycarbonates that prevents a decline in the molecular weight at the time of molding. This method involves carrying out a polycondensation reaction using an amount of $3.7 \times 10^{-6}$ mole of the sodium salt of bisphenol A as the catalyst per mole of the bisphenol A serving as the reactive monomer, and adding methyl benzenesulfonate to the polycarbonate thus obtained. However, the polycarbonate obtained by the method cited in this Kokoku has a poor initial color tone, readily undergoes yellowing at the time of melt molding, and tends to have an inferior heat resistance. Moreover, the water resistance is not enhanced, hydrolysis readily arises, and there is a tendency for the transparency to decrease.

Hence, the appearance of a method for preparing polycarbonates that is able to stably prepare polycarbonates having excellent residence stability such as hue stability and heat stability at the time of melt molding, as well as excellent water resistance and transparency, has been awaited.

The inventors conducted research on such polycarbonate production methods, as a result of which they found that by making alkali metal compounds and/or alkaline earth metal compounds present in a specific amount within the polycondensation reaction system and by adding a specific sulfonic acid compound to the polycarbonate obtained, polycarbonates can be prepared which have excellent residence stability such as hue stability and heat stability at the time of melt molding, and in particular excellent water resistance and transparency.

[OBJECT OF THE INVENTION]

The present invention was conceived in light of the above-described prior art. Its object is to provide a polycarbonate production method that is capable of preparing polycarbonates which have excellent residence stability such as hue stability and heat stability at the time of melt molding, and in particular excellent water resistance and transparency.

[GIST OF THE INVENTION]

The polycarbonate production method according to the present invention is characterized by inducing the melt polycondensation of an aromatic dihydroxy compound and a diester carbonate in the presence of a total amount in the reaction system of $5 \times 10^{-8}$ to $8 \times 10^{-7}$ mole of (a) alkali metal compounds and/or alkaline earth metal compounds per mole of the aromatic dihydroxy compound, then adding to

[A] the polycarbonate which is the reaction product thereof:

[B] a sulfonic acid compound having formula [III] below in an amount of 0.05–10 ppm, based on the polycarbonate.

[Compound 2]

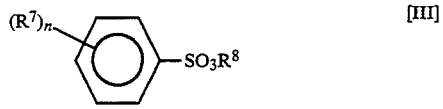

[III]

[where $R^7$ is a hydrocarbon group having 1–6 carbons (in which the hydrogens may be substituted with halogens), $R^8$ is a hydrocarbon group with 1–8 carbons (in which the hydrogens may be substituted with halogens), and n is an integer from 0 to 3].

In the polycarbonate production method according to the present invention, along with [B] the sulfonic acid compound, it is desirable to add also:

[C] an epoxy compound in an amount of 1–2000 ppm, based on the polycarbonate, and also

[D] a phosphorus compound in an amount of 10–1000 ppm, based on the polycarbonate.

In the polycarbonate production method according to the present invention, the above (a) alkali metal compounds and/or alkaline earth metal compounds should be added in an amount such that the total amount in the reaction system becomes $1 \times 10^{-7}$ to $7 \times 10^{-7}$ mole, and preferably $1 \times 10^{-7}$ to $6 \times 10^{-7}$ mole, per mole of the aromatic dihydroxy compound.

In the present invention, because polycondensation is carried out by making a given amount of (a) alkali metal compounds and/or alkaline earth metal compounds present in the reaction system and because a given specific sulfonic acid compound [B] is added to the polycarbonate [A] obtained as the reaction product, the polycondensation reaction is maintained at a high polycondensation activity, in addition to which the resulting polycarbonate has an excellent initial color tone immediately after polycondensation, an enhanced residence stability and water resistance, and also an excellent heat stability.

In the polycarbonate production method according to the present invention, polycarbonates having even further enhanced water resistances and hue stabilities can be obtained by also adding [C] an epoxy compound and [D] a phosphorus compound along with the sulfonic acid compound [B].

The polycarbonates obtained in the present invention are able to form moldings having excellent residence stability at the time of melt molding, low discoloration and, in particular, excellent water resistance and transparency.

[CONCRETE DESCRIPTION OF THE INVENTION]

The polycarbonate production method according to the present invention shall now be described more concretely.

In this invention, first a polycarbonate is prepared by inducing the melt polycondensation of an aromatic dihydroxy compound and a diester carbonate in the presence of a catalyst.

There is no particular restriction on the aromatic dihydroxy compound, but compounds indicated by formula (II) below can be cited as examples of these compounds.

[Compound 3]

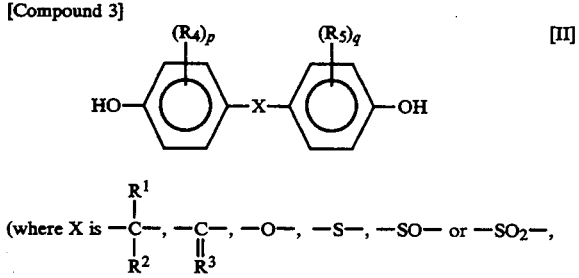

(where X is $-\overset{R^1}{\underset{R^2}{\overset{|}{\underset{|}{C}}}}-$, $-\overset{O}{\underset{R^3}{\overset{\|}{C}}}-$, $-O-$, $-S-$, $-SO-$ or $-SO_2-$, $R^1$ and $R^2$ are hydrogen atoms or monovalent hydrocarbon groups; $R^3$ is a divalent hydrocarbon group; $R^4$ and $R^5$, which may the same or different, are halogens or monovalent hydrocarbon groups; and p and q are integers from 0 to 4).

Specific examples that may be cited of the above aromatic dihydroxy compounds include the following compounds: bis(hydroxyaryl)alkanes such as bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, bis(4-hydroxyphenyl)phenylmethane, 2,2-bis(4-hydroxy-1-methylphenyl)propane, 1,1-bis(4-hydroxy-t-butylphenyl)propane and 2,2-bis(4-hydroxy-3-bromophenyl)propane; bis(hydroxyaryl)cycloalkanes such as 1,1-bis(hydroxyphenyl)cyclopentane and 1,1-bis(4-hydroxyphenyl)cyclohexane; dihydroxyaryl ethers such as 4,4'-dihydroxydiphenyl ether and 4,4'-dihydroxy-3,3'-dimethylphenyl ether; dihydroxydiarylsulfides such as 4,4'-dihydroxydiphenylsulfide and 4,4'-dihydroxy-3,3'-dimethyldiphenylsulfide; dihydroxydiarylsulfoxides such as 4,4'-dihydroxydiphenylsulfoxide and 4,4'-dihydroxy-3,3'-dimethyldiphenylsulfoxide; and dihydroxydiarylsulfones such as 4,4'-dihydroxydiphenylsulfone and 4,4'-dihydroxy-3,3'-dimethyldiphenylsulfone.

Of these, the use of 2,2-bis(4-hydroxyphenyl)propane is especially desirable.

Compounds having formula [II] [sic] below can be used as the aromatic dihydroxy compound.

[Compound 4]

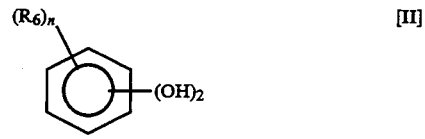

In the above formula, $R_6$ in each case represents hydrocarbon groups having 1-10 carbons, their halides, or halogens; each of these being the same or different; and n is an integer from 0 to 4.

Specific examples that may be cited of the aromatic dihydroxy compounds represented by formula [II] include substituted resorcinols such as resorcinol, 3-methylresorcinol, 3-ethylresorcinol, 3-propylresorcinol, 3-butylresorcinol, 3-t-butylresorcinol, 3-phenylresorcinol, 3-cumylresorcinol, 2,3,4,6-tetrafluororesorcinol and 2,3,4,6-tetrabromoresorcinol; catechol; and substituted hydroquinones such as hydroquinone, 3-methylhydroquinone, 3-ethylhydroquinone, 3-propylhydroquinone, 3-butylhydroquinone, 3-t-butylhydroquinone, 3-phenylhydroquinone, 3-cumylhydroquinone, 2,3,5,6-tetramethylhydroquinone, 2,3,5,6-tetra-t-butylhydroquinone, 2,3,5,6-tetrafluorohydroquinone and 2,3,5,6-tetrabromohydroquinone.

The 2,2,2',2'-tetrahydro-3,3,3',3'-tetramethyl-1,1'-spirobi-[IH-indene]-6,6'-diol represented by the following formula can also be used as the aromatic dihydroxy compound in the present invention.

[Compound 5]

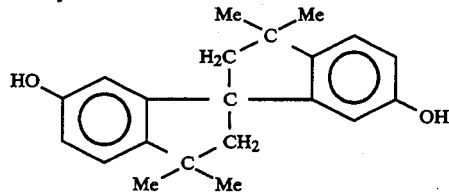

These aromatic dihydroxy compounds can be used alone or as combinations thereof.

Specific examples that may be cited of the diester carbonate include diphenyl carbonate, ditolyl carbonate, bis(chlorophenyl) carbonate, m-cresyl carbonate, dinaphthyl carbonate, bis(diphenyl) carbonate, diethyl carbonate, dimethyl carbonate, dibutyl carbonate and dicyclohexyl carbonate.

Of these, the use of diphenyl carbonate is especially desirable.

These diester carbonates can be used alone or as combinations thereof.

The above-cited diester carbonates may include preferably no more than 50 mol %, and most preferably no more than 30 mol %, of dicarboxylic acids or dicarboxylates.

Examples that may be cited of these dicarboxylic acids or dicarboxylates include aromatic dicarboxylic acids [and esters] such as terephthalic acid, isophthalic acid, diphenyl terephthalate and diphenyl isophthalate; aliphatic dicarboxylic acids [and esters] such as succinic acid, glutaric acid, adipic acid, pimelic acid, suberic acid, azelaic acid, sebacic acid, decanedioic acid, dodecanedioic acid, diphenyl sebacate, diphenyl decanedioate and diphenyl dodecanedioate; and alicyclic dicarboxylic acids [and esters] such as cyclopropanedicarboxylic acid, 1,2-cyclobutanedicarboxylic acid, 1,3-cyclobutanedicarboxylic acid, 1,2-cyclopentanedicarboxylic acid, 1,3-cyclopentanedicarboxylic acid, 1,2-cyclohexanedicarboxylic acid, 1,3-cyclohexanedicarboxylic acid, 1,4-cyclohexanedicarboxylic acid, diphenyl cyclopropanedicarboxylate, diphenyl 1,2-cyclobutanedicarboxylate, diphenyl 1,3-cyclobutanedicarboxylate, diphenyl 1,2-cyclopentanedicarboxylate, diphenyl 1,3-cyclopentanedicarboxylate, diphenyl 1,2-cyclohexanedicarboxylate, diphenyl 1,3-cyclohexanedicarboxylate and diphenyl 1,4-cyclohexanedicarboxylate.

Dicarboxylic acids or dicarboxylates such as these may be included alone or as combinations thereof.

It is desirable that the above-cited diester carbonates generally be used in an amount of 1.0–1.30 moles, and preferably 1.01–1.20 moles, per mole of aromatic dihydroxy compound.

In this invention, when preparing the polycarbonate, a polyfunctional compound having three or more functional groups per molecule may be used along with the above-cited aromatic dihydroxy compound and diester carbonate.

These polyfunctional compounds are preferably compounds having phenolic hydroxyl groups or carboxyl groups, with compounds having three phenolic hydroxyl groups being especially desirable. Specific examples that may be cited include 1,1,1-tris(4-hydroxyphenyl)ethane, 2,2',2''-tris(4-hydroxyphenyl)diisopropylbenzene, α-methyl-α,α',α'-tris(4-hydroxyphenyl)-1,4-diethylbenzene, α,α',α''-tris(4-hydroxyphenyl)-1,3,5-triisopropylbenzene, fluoroglycine, 4,6-dimethyl-2,4,6-tri(4-hydroxyphenyl)heptane-2, 1,3,5-tri(4-hydroxyphenyl)benzene, 2,2-bis-[4,4-(4,4'-dihydroxyphenyl)cyclohexyl]propane, trimellitic acid, 1,3,5-benzenetricarboxylic acid and pyromellitic acid.

Of these, the use of 1,1,1-tris(4-hydroxyphenyl)ethane, α,α',α''-tris(4-hydroxyphenyl)-1,3,5-triisopropylbenzene or the like is preferable.

The polyfunctional compounds are generally used in an amount of no more than 0.03 mole, preferably 0.001–0.02 mole, and most preferably 0.001–0.01 mole, per mole of the aromatic dihydroxy compound.

In the present invention, the above-described aromatic dihydroxy compound and diester carbonate are melt-polycondensed in the presence of a catalyst consisting of (a) alkali metal compounds and/or alkaline earth metal compounds.

Preferable examples that may be cited of alkali metal compounds and alkaline earth metal compounds that can be used as the catalyst include the organic acid salts, inorganic acid salts, oxides, hydroxides, hydrides and alcoholates of alkali metals and alkaline earth metals.

Specific examples of such alkali metal compounds include sodium hydroxide, potassium hydroxide, lithium hydroxide, sodium bicarbonate, potassium bicarbonate, lithium bicarbonate, sodium carbonate, potassium carbonate, lithium carbonate, sodium acetate, potassium acetate, lithium acetate, sodium stearate, potassium stearate, lithium stearate, sodium boron hydride, lithium boron hydride, sodium boron phenylate, sodium benzoate, potassium benzoate, lithium benzoate, disodium hydrogen phosphate, dipotassium hydrogen phosphate, dilithium hydrogen phosphate, the disodium, dipotassium and dilithium salts of bisphenol A, and the sodium, potassium and lithium salts of phenol.

Specific examples of such alkaline earth metal compounds that may be cited include calcium hydroxide, barium hydroxide, magnesium hydroxide, strontium hydroxide, calcium hydrogen carbonate, barium hydrogen carbonate, magnesium hydrogen carbonate, strontium hydrogen carbonate, calcium carbonate, barium carbonate, magnesium carbonate, strontium carbonate, calcium acetate, barium acetate, magnesium acetate, strontium acetate, calcium stearate, barium stearate, magnesium stearate and strontium stearate.

These compounds may be used alone or as combinations thereof.

These (a) alkali metal compounds and/or alkaline earth metal compounds are used in an amount of $5 \times 10^{-8}$ to $8 \times 10^{-7}$ mole, preferably $1 \times 10^{-7}$ to $7 \times 10^{-7}$ mole, and most preferably $1 \times 10^{-7}$ to $6 \times 10^{-7}$ mole, per mole of the aromatic dihydroxy compound.

The following should be done in order to use the (a) alkali metal compounds and/or alkaline earth metal compounds in the above-described amount and to make these present as catalysts in the overall reaction system.

The amount of alkali metal or alkaline earth metal impurities contained within the various components—such as the aromatic dihydroxy compound, the diester carbonate, and the nitrogen-containing basic compounds (b) described later-that are fed into the reaction system, excluding the alkali metal compounds and alkaline earth metal compounds (a), should be an amount that does not have an influence on the above amount of catalyst; for example, this should be no more than 1 ppb, in terms of metal equivalent.

In the event that these components contain a greater amount of metal or alkaline earth metal impurities than this, it is preferable that they be fed to the reaction system after being purified so as to bring the level of impurities within the respective components to 1 ppb or less, and that the alkali metal compounds and alkaline earth metal compounds (a) be added at the time of the polycondensation reaction.

In the present invention, the alkali metal compounds and alkaline earth metal compounds (a) serving as the catalyst are used in smaller amounts than in the prior art, and are made present in a limited amount in the overall reaction system.

In reaction systems in which this type of catalyst is present in a specific small amount, polycarbonate can be produced while maintaining a high polymerization activity and under constant polymerization conditions; yet, at the same time, a specific small amount of alkaline compounds becomes present in the resulting polycarbonate. Hence, discoloration of the reaction product during the reaction is diminished, and polycarbonates having an excellent initial color tone immediately after polycondensation can be obtained. Furthermore, polycarbonates can be produced that have excellent residence stability such as heat stability and hue stability, and have an especially outstanding water resistance.

In this invention, along with the above-described (a) alkali metal compound and/or alkaline earth metal compound, it is also possible to use (b) a basic compound as the catalyst.

This basic compound (b) may be, for example, a nitrogen-containing basic compound that readily decomposes or volatilizes at high temperatures. Specific examples that may be cited include the following compounds.

Ammonium hydroxides having alkyl, aryl, or aralkyl groups, such as tetramethylammonium hydroxide ($Me_4NOH$), tetraethylammonium hydroxide ($Et_4NOH$), tetrabutylammonium hydroxide ($Bu_4NOH$) and trimethylbenzylammonium hydroxide ($\phi\text{-}CH_2(Me)_3NOH$); tertiary amines such as trimethylamine, triethylamine, dimethylbenzylamine and triphenylamine; secondary amines having the formula $R_2NH$ (where R is an alkyl such as methyl or ethyl, an aryl group such as phenyl or toluyl, or the like); primary amines having the formula $RNH_2$ (where R is the same as above); imidazoles such as 2-methylimidazole and 2-phenylimidazole; and basic salts such as ammonia, tetramethylammonium borohydride ($Me_4NBH_4$), tetrabutylammonium borohydride ($Bu_4NBH_4$), tetrabutylammonium tetraphenyl borate ($Bu_4NBPh_4$) and tetramethylammonium tetraphenylborate ($Me_4NBPh_4$).

Of these, preferable use can be made of tetralkylammonium hydroxides, and especially low-metal-impurity tetraalkylammonium hydroxides intended for electronics applications.

When nitrogen-containing basic compounds (b) such as those cited above are used as the catalyst, the nitrogen-containing basic compounds (b) are used in an amount of $10^{-6}$ to $10^{-1}$ mole or less, and preferably $10^{-5}$ to $10^{-2}$ mole, per mole of the aromatic dihydroxy compound.

In addition, (c) boric acid compounds can be used as the catalyst.

Examples that may be cited of such boric acid compounds (c) include boric acid and borates.

Examples that may cited of the borates include those borates having the following formula.

$B(OR)_n(OH)_{3-n}$ where R is an alkyl such as methyl or ethyl, or an aryl such as phenyl; and n is 1, 2 or 3.

Specific examples that may be cited of borates such as these include trimethylborate, triethyl borate, tributyl borate, trihexyl borate, triheptyl borate, triphenyl borate, tritolyl borate and trinaphthyl borate.

When boric acid or a borate (c) is used, this is used in an amount of $10^{-8}$ to $10^{-1}$ mole, preferably $10^{-7}$ to $10^{-2}$ mole, and most preferably $10^{-6}$ to $10^{-4}$ mole, per mole of the aromatic dihydroxy compound.

Preferable use of these as the catalyst can be made by combining, for example,
(a) alkali metal compounds and/or alkaline earth metal compounds, and
(b) nitrogen-containing basic compounds, or by combining
(a) alkali metal compounds and/or alkaline earth metal compounds,
(b) nitrogen-containing basic compounds, and
(c) boric acid or borates.

Thus, catalyst consisting of a combination of (a) alkali metal compounds and/or alkaline earth metal compounds, and (b) nitrogen-containing basic compounds causes the polycondensation reaction to proceed at a sufficient rate, making it possible to prepare high-molecular-weight polycarbonate at a high polymerization activity.

Polycondensation reactions between the aromatic dihydroxy compound and the diester carbonate in the presence of a catalyst such as this can be carried out under the same conditions as the polycondensation reaction conditions hitherto known to the art.

Specifically, in the step one reaction, the aromatic dihydroxy compound and the diester carbonate are reacted at normal pressure, a temperature of 80°–250° C., preferably 100°–230° C., and most preferably 120°–190° C., and for 0–5 hours, preferably 0–4 hours, and most preferably 0–3 hours. Next, the reaction temperature is raised and the reaction between the aromatic dihydroxy compound and the diester carbonate is carried out while placing the reaction system under a vacuum; polycondensation between the aromatic dihydroxy com-pound and the diester carbonate is ultimately carried out under a vacuum of 5 mmHg or less, and preferably 1 mmHg or less, and at 240°–320° C.

The polycondensation reaction described above may be carried out as a continuous process or as a batch-type process. The reaction apparatus used when carrying out the above reaction may be a tank-type, tube-type, or column-type apparatus.

The polycarbonate reaction product obtained in the above manner generally has an intrinsic viscosity, as measured in 20° C. methylene chloride, of 0.10–1.0 dL/g, and preferably 0.30–0.65 dL/g.

As described above, production methods according to the present invention are desirable from the standpoint of environmental health because they do not use toxic substances such as phosgene or methylene chloride in melt polycondensation.

In the present invention, sulfonic acid compounds [B] having formula [III] below are added to the polycarbonate [A] reaction product obtained in the above manner.

[Compound 6]

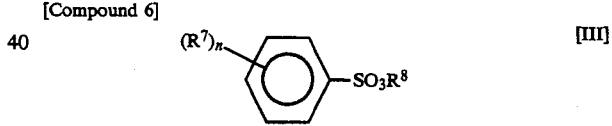

[III]

where $R^7$ is a hydrocarbon group with 1–6 carbons (in which the hydrogens may be substituted with halogens), $R^8$ is a hydrogen or a hydrocarbon group with 1–8 carbons (in which the hydrogens may be substituted with halogens), and n is an integer from 0 to 3, and preferably 0 or 1.

Examples that may be cited of sulfonic acid compounds [B] represented by formula [III] include the following compounds: sulfonic acids such as benzenesulfonic acid and p-toluenesulfonic acid; sulfonates such as methyl benzenesulfonate, ethyl benzenesulfonate, butyl benzenesulfonate, octyl benzenesulfonate, phenyl benzenesulfonate, methyl p-toluenesulfonate, ethyl p-toluenesulfonate, butyl p-toluenesulfonate, octyl p-toluenesulfonate and phenyl p-toluenesulfonate, Sulfonic acid compounds such as trifluoromethanesulfonic acid, naphthalenesulfonic acid, sulfonated polystyrene and methyl acrylate-styrene sulfonate copolymers may also be used.

These compounds can be used alone or as combinations thereof.

In the present invention, preferable use can be made of those sulfonic acid compound [B] having formula [III] in which $R^7$ is a methyl group, $R^8$ is an aliphatic hydrocarbon group having 1–6 carbons, and n is integer 0 or 1. More specifically, the use of p-toluenesulfonic acid or butyl p-toluenesulfonate is preferable.

In the present invention, the sulfonic acid compound [B] represented by formula [III] is added in an amount of 0.05–10 ppm, preferably 0.1–5 ppm, and most preferably 0.2–2 ppm, based on the above polycarbonate [A].

The alkaline metal compound remaining in the polycarbonate 8 A] is neutralized or weakened by the addition of a specific sulfonic acid compound [B] to the polycarbonate reaction product [A], ultimately making it possible to obtain polycarbonate having an even more enhanced residence stability and water resistance.

In polycarbonate production methods according to the present invention, it is preferable to add epoxy compounds [C] together with the sulfonic acid compounds [B] described above.

Compounds having one or more epoxy group per molecule can be used as these epoxy compounds [C].

Specific examples that may be cited of epoxy compounds such as these include epoxidized soybean oil, epoxidized linseed oil, phenylglycidyl ether, allylglycidyl ether, t-butylphenylglycidyl ether, 3,4-epoxycyclohexylmethyl-3′,4′-epoxycyclohexylcarboxylate, 3,4-epoxy-6-methylcyclohexylmethyl-3′,4′-epoxy-6′-methylcyclohexylcarboxylate, 2,3-epoxycyclohexylmethyl-3′,4′-epoxycyclohexylcarboxylate, 4-(3,4-epoxy-5-methylcyclohexyl)butyl-3′,4′-epoxycyclohexylcarboxylate, 3,4-epoxycyclohexylethylene oxide, cyclohexylmethyl-3,4epoxycyclohexylcarboxylate, 3,4-epoxy-6-methylcyclohexylmethyl-6′-methylcyclohexylcarboxylate, bisphenol A diglycidyl ether, tetrabromobisphenol A glycidyl ether, the diglycidyl ester of phthalic acid, the diglycidyl ester of hexahydrophthalic acid, bis-epoxydicyclopentadienyl ether, bis-epoxyethylene glycol, bis-epoxyclehexyl adipate, butadiene diepoxide, tetraphenylethylene epoxide, octyl epoxyphthalate, epoxidized polybutadiene, 3,4-dimethyl-1,2-epoxycyclohexane, 3,5-dimethyl-1,2-epoxycyclohexane, 3-methyl-5-t-butyl-1,2-epoxycylehexane, octadecyl-2,2-dimethyl-3,4-epoxycyclohexylcarboxylate, N-butyl-2,2-dimethyl-3,4-epoxycyclohexylcarboxylate, cyclohexyl-2-methyl -3,4-epoxycyclohexylcarboxylate, N-butyl-2-isopropyl-3,4-epoxy-5-methylcyclohexylcarboxylate, octadecyl-3,4-epoxycyclohexylcarboxylate, 2-ethylhexyl-3′,4′-epoxycyclohexylcarboxylate, 4,6-dimethyl-2,3-epoxycyclohexyl-3′,4′-epoxycyclohexylcarboxylate, 4,5-epoxytetrahydrophthalic anhydride, 3-t-butyl-4,5-epoxytetrahydrophthalic anhydride, diethyl4,5-epoxy-cis-1,2-cyclohexyldicarboxylate and di-n-butyl-3-t-butyl-4,5-epoxy-cis-1,2-cyclohexyldicarboxylate.

Of these, the use of alicyclic epoxy compounds preferable, with the use of 3,4-epoxycyclohexylmethyl-3′,4′-epoxycyclohexylcarboxylate being especially preferable.

These may be used alone or as mixtures of two or more thereof.

In the present invention, this type of epoxy compound [C] should be added in an amount of 1–2000 ppm, and preferably 10–1000 ppm, based on the above polycarbonate.

When this kind of epoxy compound [C] is added in the above amount, even if an excess of the above sulfonic acid compound [B] remains present within the polycarbonate [A], it reacts with the epoxy compound [C] and is thereby neutralized, enabling polycarbonate having an improved water resistance to be obtained.

In the polycarbonate production method according to the present invention, a phosphorus compound [D] may be added along with the sulfonic acid compound [B].

Examples of compounds that may be used as these phosphorus compounds [D] include phosphoric acid, phosphorous acid, hypophosphorous acid, pyrophosphoric acid, polyphosphoric acid, phosphates, and phosphites.

Specific examples that may be cited of phosphates such as these include trialkylphosphates such as trimethylphosphate, triethylphosphate, tributylphosphate, trioctylphosphate, tridecylphosphate, trioctadecylphosphate, distearylpentaerythrityldiphosphate, tris(2-chloroethyl)phosphate and tris(2,3-dichloropropyl)-phosphate; tricycloroalkylphosphates such as tricyclohexylphosphate; and triarylphosphates such as triphenylphosphate, tricresylphosphate, tris(nonylphenyl)phosphate and 2-ethylphenyldiphenylphosphate.

Examples that may be cited of phosphites include those compounds having the following formula

(where R is an allcyclic hydrocarbon group, an aliphatic hydrocarbon group or an aromatic hydrocarbon group; the groups represented by R may be the same or different).

Specific examples that may be cited of compounds having this type of formula include trialkylphosphites such as trimethylphosphite, triethylphosphite, tributylphosphite, trioctylphosphite, tris(2-ethylhexyl)phosphite, trinonylphosphite, tridecylphosphite, trioctadecylphosphite, tristearylphosphite, tris(2-chloroethyl)phosphite and tris(2,3-dichloropropyl)phosphite; tricycloalkylphosphites such as tricyclohexylphosphite; triarylphosphites such as triphenylphosphite, tricresylphosphite, tris(ethylphenyl)phosphite, tris(2,4-di-t-butylphenyl)phosphite, tris(nonylphenyl)phosphite and tris(hydroxyphenyl)phosphite; and arylalkylphosphites such as phenyldidecylphosphite, diphenyldecylphosphite, diphenylisooctylphosphite, phenylisooctylphosphite and 2-ethylhexyldiphenylphosphite.

Other examples of phosphites that may be cited include distearylpentaerythrityldiphosphite and bis(2,4-di-t-butylphenyl)pentaerythrityldiphosphite.

These compounds can be used alone or as combinations thereof.

Of the above, it is desirable that the phosphorus compounds [C] be phosphites having the above formula, preferably aromatic phosphites, and most preferably tris(2,4-di-t-butylphenyl)phosphite.

These may be added separately and at the same time.

In the present invention, phosphorus compounds [D] such as the above are added in an amount of 10–1000 ppm, and preferably 50–500 ppm, based on the polycarbonate [A].

In the present invention, the above-described sulfonic acid compounds [B] and, where necessary, epoxy compounds [C] and/or phosphorus compounds [D], may be added to the polycarbonate [A] reaction product while the polycarbonate [A] is in a molten state, or they they may be added after remelting polycarbonate [A] that has been pelletized. In the former case, these are added while the polycarbonate [A] reaction product obtained within the reactor or within an extruder following completion of the polycondensation reaction is in a molten state.

More specifically, for example, after polycarbonate has been formed by adding compounds [B] and, if necessary, compounds [C] and [D], to the polycarbonate [A] obtained by the polycondensation reaction within the reactor, these may be passed through an extruder and pelletized; alternatively, the polycarbonate may be obtained by adding compounds [B], and if necessary compounds [C] and [D], and kneading these while the polycarbonate [A] obtained in the polycondensation reaction is being passed through an extruder and pelletized.

These various compounds may be added simultaneously or separately. The order in which these compounds is added is of no import.

In the present invention, additives such as conventional heat stabilizers, ultraviolet absorbers, parting agents, colorants, antistatic agents, slip agents, anti-blocking agents, lubricants, anti-fogging agents, natural oils, synthetic oils, waxes, organic fillers and inorganic fillers, examples of which are indicated below, may be added to the polycarbonate obtained in the above manner, provided these do not have adverse effects upon the object of this invention. These additives may be added at the same time as the above compounds [B], [C] and [D], or they may be added separately.

Examples that may be cited of such heat stabilizers include phenol-based stabilizers, organic thioether-based stabilizers and hindered amine-based stabilizers.

Specific examples that may be cited of phenol-based stabilizers include n-octadecyl-3(4-hydroxy-3',5'-di-t-butylphenyl)propionate, tetrakis[(methylene-3(3',5'-di-t-butyl-4-hydroxyphenyl)propionate]methane, 1,1,3(tris(2-methyl-4-hydroxy-5-t-butylphenyl)butane, distearyl(4-hydroxy-3-methyl-5-t-butyl)benzylmalonate and 4-hydroxymethyl-2,6-di-t-butylphenol. These may used alone or as mixtures of two or more thereof.

Examples that may be cited of thioether-based stabilizers include dilauryl thiodipropionate, distearyl thiodipropionate, dimyristyl-3,3'-thiodipropionate, ditridecyl-3,3'-thiodipropionate and pentaerythritol-tetrakis-(β-laurylthiopropionate).

These may be used alone or as mixtures of two or more thereof.

Examples that may be cited of hindered amine-type stabilizers include bis(2,2,6,6-tetramethyl-4-piperidyl)-sebacate, bis(1,2,2,6,6-pentamethyl-4-piperidyl)sebacate, 1-(2-[3-(3,5-di-t-butyl-4-hydroxyphenyl)propionyloxy]ethyl)-4-[3-(3,5-di-t-butyl-4-hydroxyphenyl)-propionyloxy]-2,2,6,6-tetramethylpiperidine, 8-benzyl-7,7,9,9-tetramethyl-3-octyl-1,2,3-triazaspiro[4,5]undecane-2,4-dione, 4-benzoyloxy-2,2,6,6-tetramethylpiperidine, 2-(3,5-di-t-butyl-4-hydroxybenzyl)-2-n-butylmalonic acid bis(1,2,2,6,6-pentamethyl-4-piperidyl) and tetrakis(2,2,6,6-tetramethyl-4-piperidyl) 1,2,3,4-butanetetracarboxylate.

These may be used alone or as mixtures of two or more thereof.

These heat stabilizers should be used in an amount of 0.001–5 parts by weight, preferably 0.005–0.5 part by weight, and most preferably 0.01–0.3 part by weight, per 100 parts by weight of the polycarbonate [A].

These heat stabilizers may be added in a solid state or in a liquid state.

It is preferable that this type of heat stabilizer be added while the polycarbonate [A] is in a molten state during the period when it is cooled and pelletized [after removal] from the final polymerizer; by so doing, the thermal history incurred by the polycarbonate is small. Moreover, when heating treatment such as extrusion or palletization is again carried out, thermal decomposition can be suppressed because the polycarbonate contains a heat stabilizer.

There is no particular restriction on the ultraviolet absorbers used, it being possible to use conventional ultraviolet absorbers such as salicylic acid-type ultraviolet absorbers, benzophenone-type ultraviolet absorbers, benzotriazole-type ultraviolet absorbers and cyanoacrylate-type ultraviolet absorbers.

Specific examples of salicylic acid-type ultraviolet absorbers that may be cited include phenylsalicylate and p-t-butylphenylsalicylate.

Examples that may be cited of benzophenone-type ultraviolet absorbers include 2,4-dihydroxybenzophenone, 2-hydroxy-4-methoxybenzophenone, 2,2'-dihydroxy-4-methoxybenzophenone, 2,2'-dihydroxy-4,4'-dimethoxybenzophenone, 2-hydroxy-4-methoxy-2'-carboxybenzophenone, 2-hydroxy-4-methoxy-5-sulfobenzophenonetrihydrate, 2-hydroxy-4-n-octoxybenzophenone, 2,2',4,4'-tetrahydroxybenzophenone, 4-dodecyloxy-2-hydroxybenzophenone, bis(5-benzoyl-4-hydroxy-2-methoxyphenyl)methane, and 2-hydroxy-4-methoxybenzophenone-5-sulfonic acid.

Examples that may be cited of benzotriazole-type ultraviolet absorbers include 2-(2'-hydroxy-5'-methylphenyl)benzotriazole, 2-(2'-hydroxy-3',5'-di-t-butylphenyl)benzotriazole, 2-(2'-hydroxy-3'-t-butyl-5'-methylphenyl)-5-chlorobenzotriazole, 2-(2'-hydroxy-3,5'-di-t-butylphenyl)-5-chlorobenzotriazole, 2-(2'-hydroxy-5'-t-octylphenyl)benzotriazole, 2-(2'-hydroxy-3',5'-di-t-amylphenyl)benzotriazole, 2-[2'-hydroxy-3'(3'',4''5'',6''-tetrahydrophthalimidomethyl)-5'-methylphenyl]benzotriazole and 2,2'-methylenebis[4-(1,1,3,3-tetramethylbutyl)-6-(2H-benzotriazole-2-yl)phenol.

Examples that may be cited of cyanoacrylate-type ultraviolet absorbers include 2-ethylhexyl-2-cyano-3,3-diphenylacrylate and ethyl-2-cyano-3,3-diphenylacrylate. These may be used alone or as mixtures of two or more thereof.

These ultraviolet absorbers can generally be used in an amount of 0.001–5 parts by weight, preferably 0.005–1.0 part by weight, and even more preferably 0.01–0.5 part by weight, per 100 parts by weight of the polycarbonate [A].

There is no particular restriction on the parting agents, it being possible to use common parting agents.

Examples of hydrocarbon-type parting agents that may be cited include natural and synthetic paraffins, polyethylene waxes and fluorocarbons.

Examples that may be cited of fatty acid-type parting agents are higher fatty acids such as stearic acid and hydroxystearic acid, and oxyfatty acids.

Examples that may be cited of fatty amide-type parting agents include fatty amides such as stearamide and ethylenebisstearamide, and alkylenebisfatty amides.

Examples that may be cited of alcohol-type parting agents include fatty alcohols such as stearyl alcohol and cetyl alcohol, polyhydric alcohols, polyglycols and polyglycerols.

Examples that may be cited of fatty ester-type parting agents include the lower alcohol esters of fatty acids such as butyl stearate and pentaerythritol tetrastearate, the polyhydric alcohol esters of fatty acids, and the polyglycol esters of fatty acids.

Examples that may be cited of silicone-type parting agents include silicone oils. These may be used alone or as mixtures of two or more thereof.

These parting agents can generally be used in an amount of 0.001-5 parts by weight, preferably 0.005-1 part by weight, and most preferably 0.01-0.5 part by weight, per 100 parts by weight of the polycarbonate [A].

The colorants may be pigments or dyes. There are both inorganic and organic colorants, either of which may be used; it is also possible to use combinations of both.

Specific examples that may be cited of inorganic colorants include oxides such as titanium dioxide and red oxide, hydroxides such as alumina white, sulfides such as zinc sulfide, selenides, ferrocyanides such as Prussian blue, chromates such as zinc chromate and molybdenum red, sulfates such as barium sulfate, carbonates such as calcium carbonate, silicates such as ultramarine blue, phosphates such as manganese violet, carbons such as carbon black, and metal powder colorants such as bronze powder and aluminum powder.

Specific examples of organic colorants that may be cited include nitroso compounds such as naphthol green B, nitro compounds such as naphthol yellow S, azo compounds such as lithol red, bordeaux 10B, naphthol red and chromophthal yellow; phthalocyanine compounds such as phthalocyanine blue and fast sky blue, and condensed polycyclic colorants such as indanthrone blue, quinacridone violet and dioxazine violet.

These colorants may be used alone or as combinations thereof.

These colorants can generally be used in an amount of $1 \times 10^{-6}$ to 5 parts by weight, preferably $1 \times 10^{-5}$ to 3 parts by weight, and most preferably $1 \times 10^{-5}$ to 1 part by weight, per 100 parts by weight of the polycarbonate [A].

In this invention, the polycarbonate obtained in the above manner should be administered vacuum treatment.

There is no particular restriction on the apparatus used when carrying out this type of vacuum treatment; for example, a reactor equipped with a vacuum apparatus or an extruder equipped with a vacuum apparatus may be used.

When a reactor is used, this may be either a vertical tank-type reactor or a horizontal tank-type reactor, although use of a horizontal tank-type reactor is most preferable.

When the vacuum treatment is conducted in the above-described type of reactor, it is carried out at a pressure of 0.05-750 mmHg, and preferably 0.05-5 mmHg.

When this kind of vacuum treatment is conducted using an extruder, it should be carried out over a period of about 10 seconds to 15 minutes. When it is conducted using a reactor, it should be carried out over a period of about 5 minutes to 3 hours. The vacuum treatment should be carried out at a temperature of about 240°-350° C.

When the vacuum treatment is carried out in an extruder, a single-screw extruder or twin-screw extruder equipped with a belt may be used. Pelletization can be carried out while conducting vacuum treatment in an extruder.

When vacuum treatment is carried out in an extruder, the vacuum treatment is carried out at a pressure of 1-750 mmHg, and preferably 5-700 mmHg.

When vacuum treatment is administered in this way after the addition to polycarbonate of sulfonic acid compounds [B] and, where necessary, epoxy compounds [C] and phosphorus compounds [D], a polycarbonate wi-.h a reduced level of residual monomers and oligomers can be obtained.

The polycarbonate obtained in this invention has a low discoloration immediately after polycondensation and an excellent residence stability at the time of melt molding. Hence, thermal decomposition does not readily arise during molding; in addition, [the polycarbonate] is not prone to decreases in molecular weight or yellowing, and also has an excellent hue stability.

Also, in polycarbonate compositions containing epoxy compounds, the water resistance is improved and the transparency is less apt to decrease.

Because polycarbonates such as these can be formed into moldings having excellent long-term hue stability and excellent transparency, broad use can be made of such polycarbonates, particularly in optical applications such as sheets, lenses and compact disks, in transparent components for automobiles or the like used outdoors, and also in housings for various types of equipment.

[ADVANTAGES OF THE INVENTION]

In the polycarbonate production method according to the present invention, melt polycondensation is carried out by making the alkali metal compounds and/or alkaline earth metal compounds serving as the catalyst present in a specific amount within the reaction system and adding specific sulfonic acid compounds to the polycarbonate obtained.

By means of this type of polycarbonate production method according to the present invention, the polycondensation reaction can be carried out stably while maintaining a high polymerization activity. Moreover, a polycarbonate can be obtained that has an excellent initial color tone immediately after polycondensation, improved residence stability and water resistance, and improved heat stability.

Also, it is preferable that epoxy compounds and/or phosphorus compounds be added along with these sulfonic acid compounds, thereby making it possible to obtain polycarbonates having even further improved water resistances and hue stabilities.

The polycarbonates obtained in this invention have excellent residence stability at the time of melt molding, and are able to form moldings having particularly excellent water resistance and transparency.

The present invention shall now be described by means of examples, although the invention shall in no way be restricted by these examples.

[EXAMPLES]

In this specification, the intrinsic viscosity (IV), MFR, hue (YI), light transparency, haze, residence stability and water resistance of the polycarbonate were measured as follows.

[Intrinsic Viscosity (IV)]

This was measured at 20° C. in methylene chloride using an Ubbelohde viscometer.

[MFR]

This was measured at a temperature of 300° C. and a load of 1.2 kg in general accordance with the method in JIS K-7210.

[Yellowness]

An injection-molded sheet having a thickness of 3 mm was molded at a cylinder temperature of 290° C., an injection pressure of 1000 kg/cm², a cycle time of 45 seconds, and a mold temperature of 100° C. The X, Y and Z values were measured by the transmission method using a Color and Color Difference Meter ND-1001 DP made by Nippon Denshoku Kogyo KK, and the yellow index (YI) was measured.

$$YI = 100(1.277X - 1.060Z)/Y$$

[Light Transmittance]

Using the injection molded sheet prepared for hue measurement, the light transmittance was measured in accordance with the method in ASTM D 1003.

[Haze]

The haze of the injection-molded sheet for hue measurement was measured using an NDH-200 made by Nippon Denshoku Kogyo KK.

[MFR]

The MFR was measured at a temperature of 300° C. and a load of 1.2 kg, in general accordance with the method in JIS K-7210

[Residence Stability]

After retaining the resin within the cylinder of the injection molding machine for 15 minutes at a temperature of 320° C., injection molding was carried out at that temperature, and the MFR, hue (YI) and light transmittance of the molded sheet were measured.

[Water Resistance]

The injection-molded sheet for hue measurement was immersed in water within an autoclave, and held for 5 days in an oven at 125° C. The haze was measured using this test piece.

[Elemental Analysis]

Quantitative determinations of alkali metal e and alkaline earth metals were carried out on 100-mg samples using a flameless atomic absorption spectroscopic analyzer (model TSC-10; Mitsubishi Kasei Corp.)

[EXAMPLES]

An elemental analysis of bisphenol A (GE Plastics Japan) was conducted, from which the combined level of alkali metals and of alkaline earth metals was found to be less than 1 ppb; hence, this was used directly as a starting material.

The diphenyl carbonate ("Enii"* Co.) was purified by distillation; this was used as a starting material after the amount of alkali metals and alkaline earth metals was confirmed to be less than 1 ppb.

A 20% aqueous solution of tetramethylammonium hydroxide (Toyo Gosei) was used as a starting material after the level of alkali metals and alkaline earth metals was confirmed to be less than 1 ppb.

[Example 1]

After charging a 250-liter tank-type stirring tank with 0.44 kilomole of bisphenol A and 0.46 kilomole of diphenyl carbonate, and flushing the tank with nitrogen, [the mixture] was melted at 140° C.

Next, the temperature was raised to 180° C., 0.000176 mole ($4 \times 10^{-7}$ mole/mole of hisphenol A) cf sodium hydroxide and 0.11 mole ($2.5 \times 10^{-4}$ mole/mole of bisphenol A) were added as the catalyst, and [the mixture] was stirred for 30 minutes.

*Translator's Note: Proper names for which the English spellings are unconfirmed are placed in quotation marks.

The temperature was then raised to 210° C. and the pressure was at the same time gradually lowered to 200 mmHg; 30 minutes later, the temperature was raised To 240° C. and the pressure was simultaneously lowered gradually to 15 mmHg, after which both temperature and pressure were held constant and the amount of phenol distilled off was measured. At the point in time at which the phenol stopped being driven off, the pressure was returned to atmospheric pressure with nitrogen. The time required for reaction was one hour. The intrinsic viscosity [$\eta$] of the reaction product was 0.15 L/g.

Next, this reaction product was pressurized with a gear pump and sent into a centrifugal thin-film evaporator, where the reaction was allowed to proceed. The temperature and pressure of the thin-film evaporator were respectively controlled to 270° C. and 2 mmHg. [The reaction product] was sent by means of a gear pump from the bottom of the evaporator into a two-shaft lateral-type stirring polymerization tank (L/D t 3; stirring element rotational diameter, 220 ram; capacity. 80 liters) controlled to 293° C. and 0.2 mmHg at a rate of 40 kg/hour, and polymerized at a residence time of 30 minutes.

Next, this polymer was sent in a molten state by means of a gear pump into a twin-screw extruder (L/D=17.5; barrel temperature, 285° C). This was kneaded with 0.7 ppm of butyl p-toluenesulfonate, after which it was passed through a die and formed into strands. then cut so as to give pellets.

The intrinsic viscosity (IV) of the polymer thus obtained was 0.49 dL/g.

The results are shown in Table 1.

[Example 2]

Pellets were obtained by the same method as in Example 1, except that 300 ppm of 3,4-epoxycyclohexylmethyl-3',4'-epoxycyclohexylcarboxylate ("Celoxide" 2021P; Daicel Chemical Industries) was added along with the 0.7 ppm of butyl p-toluenesulfonate.

The results are shown in Table 1.

[Example 3]

Pellets were obtained by the same method as in Example 1, except that 300 ppm of 3,4-epoxycyclohexylmethyl-3',4'-epoxycyclohexylcarboxylate ("Celoxide" 2021P; Daicel Chemical Industries) and 300 ppm of tris(2,4-di-t-butylphenyl)phosphite ("Mark" 2112: "Adeka Argas" Co.) were added along with the 0.7 ppm of butyl p-toluenesulfonate.

The results are shown in Table 1.

[Examples 4–12]

Pellets were obtained by the same method as in Example 1, aside from the use of the catalysts and additives in Table 1 in the indicated amounts, and aside from setting the final polymerization temperature at 290° C. in Examples 4–6, and at 289° C. in Examples 7–9.

The results are shown in Table 1.

[Example 13]

Pellets were obtained by the same method as in Example 1, except that tetramethylammonium hydroxide was not used, and the reaction was carried out at 180° C. for 2 hours and at 210° C. for 1 hour.

[Reference Examples 1-8]

Pellets were obtained by the same method as in Example 1, aside from the use of the catalysts and additives in Table 1 in the indicated amounts, and aside from setting the final polymerization temperature at 287° C. in Reference Examples 1-3, at 285° C. Reference Example 4, at 282° C. in Reference Example 5, at 293° C. in Reference Example 7, and at 280° in Reference Example 8.

The results are shown in Table 1.

In Reference Example 6, the final temperature of reactor was raised to 310° C. and the polycondensation reaction was carried out, but the molecular weight (intrinsic viscosity [$\eta$] temperature) did not rise to the target level.

TABLE 1

| | Example 1 | Example 2 | Example 3 | Example 4 |
|---|---|---|---|---|
| Catalyst | | | | |
| 1) NaOH amount, $10^{-7}$ mol/BPA) | 4.0 | 4.0 | 4.0 | 6.0 |
| 2) Me$_4$NOH amount ($10^{-4}$ mole/BPA) | 2.5 | 2.5 | 2.5 | 2.5 |
| Additive | | | | |
| [B] Compound | BTS | BTS | BTS | BTS |
| (amount used, ppm) | 0.7 | 0.7 | 0.7 | 1.1 |
| [C] Epoxy Compound | — | 2021P | 2021P | — |
| (amount used, ppm) | — | 300 | 300 | — |
| [D] Phosphorus Compound | — | — | TDBPP | — |
| (amount used, ppm) | — | — | 300 | — |
| Initial properties | | | | |
| IV (dL/g) | 0.49 | 0.49 | 0.49 | 0.49 |
| YI | 1.41 | 1.41 | 1.40 | 1.44 |
| Light transmittance (%) | 90.9 | 90.9 | 90.9 | 90.9 |
| Haze | 0.2 | 0.2 | 0.2 | 0.2 |
| MFR (g/10 min) | 10.4 | 10.3 | 10.4 | 10.5 |
| Residence stability | | | | |
| YI | 1.51 | 1.52 | 1.41 | 1.54 |
| MFR (g/10 min) | 10.6 | 10.5 | 10.6 | 10.8 |
| MFR rise (%) | 2 | 2 | 2 | 3 |
| Water resistance | | | | |
| Haze | 0.6 (C, T, TC) | 0.5 (C, T, NC) | 0.8 (C, T, NC) | 0.9 (C, T, TC) |

| | Example 5 | Example 6 | Example 7 | Example 8 |
|---|---|---|---|---|
| Catalyst | | | | |
| 1) NaOH amount, $10^{-7}$ mol/BPA) | 6.0 | 6.0 | 7.0 | 7.0 |
| 2) Me$_4$NOH amount ($10^{-4}$ mole/BPA) | 2.5 | 2.5 | 2.5 | 2.5 |
| Additive | | | | |
| [B] Compound | BTS | BTS | BTS | BTS |
| (amount used, ppm) | 1.1 | 1.1 | 1.3 | 1.3 |
| [C] Epoxy Compound | 2021P | 2021P | — | 2021P |
| (amount used, ppm) | 300 | 300 | — | 300 |
| [D] Phosphorus Compound | — | TDBPP | — | — |
| (amount used, ppm) | — | 300 | — | — |
| Initial properties | | | | |
| IV (dL/g) | 0.49 | 0.49 | 0.49 | 0.49 |
| YI | 1.44 | 1.43 | 1.49 | 1.49 |
| Light transmittance (%) | 90.9 | 90.9 | 90.9 | 90.9 |
| Haze | 0.2 | 0.2 | 0.2 | 0.2 |
| MFR (g/10 min) | 10.4 | 10.4 | 10.3 | 10.3 |
| Residence stability | | | | |
| YI | 1.55 | 1.45 | 1.59 | 1.59 |
| MFR (g/10 min) | 10.6 | 10.6 | 10.5 | 10.5 |
| MFR rise (%) | 2 | 2 | 2 | 2 |
| Water resistance | | | | |
| Haze | 0.7 (C, T, NC) | 1.0 (C, T, NC) | 1.0 (C, T, TC) | 0.9 (C, T, NC) |

| | Example 9 | Example 10 | Example 11 | Example 12 |
|---|---|---|---|---|
| Catalyst | | | | |
| 1) NaOH amount, $10^{-7}$ mol/BPA) | 7.0 | 4.0 | 4.0 | 4.0 |
| 2) Me$_4$NOH amount ($10^{-4}$ mole/BPA) | 2.5 | 2.5 | 2.5 | 2.5 |
| Additive | | | | |
| [B] Compound | BTS | TS | TS | TS |
| (amount used, ppm) | 1.3 | 0.5 | 0.5 | 0.5 |
| [C] Epoxy Compound | 2021P | — | 2021P | 2021P |
| (amount used, ppm) | 300 | — | 300 | 300 |
| [D] Phosphorus Compound | TDBPP | — | — | TDBPP |
| (amount used, ppm) | 300 | — | — | 300 |
| Initial properties | | | | |
| IV (dL/g) | 0.49 | 0.49 | 0.49 | 0.49 |
| YI | 1.48 | 1.41 | 1.41 | 1.40 |
| Light transmittance (%) | 90.9 | 90.9 | 90.9 | 90.9 |
| Haze | 0.2 | 0.2 | 0.2 | 0.2 |
| MFR (g/10 min) | 10.4 | 10.3 | 10.3 | 10.3 |
| Residence stability | | | | |
| YI | 1.49 | 1.50 | 1.51 | 1.42 |
| MFR (g/10 min) | 10.6 | 10.5 | 10.5 | 10.5 |
| MFR rise (%) | 2 | 2 | 2 | 2 |
| Water resistance | | | | |
| Haze | 1.1 (C, T, NC) | 0.7 (C, T, TC) | 0.7 (C, T, NC) | 0.9 (C, T, NC) |

| | Example 13 |
|---|---|
| Catalyst | |
| 1) NaOH amount, $10^{-7}$ mol/BPA) | 4.0 |
| 2) Me$_4$NOH amount ($10^{-4}$ mole/BPA) | — |
| Additive | |
| [B] Compound | BTS |
| (amount used, ppm) | 0.7 |
| [C] Epoxy Compound | — |
| (amount used, ppm) | — |
| [D] Phosphorus Compound | — |
| (amount used, ppm) | — |
| Initial properties | |
| IV (dL/g) | 0.49 |
| YI | 1.41 |
| Light transmittance (%) | 90.9 |
| Haze | 0.2 |
| MFR (g/10 min) | 10.4 |
| Residence stability | |
| YI | 1.52 |
| MFR (g/10 min) | 10.6 |
| MFR rise (%) | 2 |
| Water resistance | |
| Haze | 0.7 (C, T, NC) |

| | Reference Example 1 | Reference Example 2 | Reference Example 3 | Reference Example 4 |
|---|---|---|---|---|
| Catalyst | | | | |
| 1) NaOH | 10.0 | 10.0 | 10.0 | 20.0 |

TABLE 1-continued

| | | | | |
|---|---|---|---|---|
| amount, $10^{-7}$ mol/BPA) | | | | |
| 2) Me₄NOH amount ($10^{-4}$ mole/BPA) | 2.5 | 2.5 | 2.5 | 2.5 |
| Additive | | | | |
| [B] Compound | BTS | BTS | BTS | BTS |
| (amount used, ppm) | 1.8 | 1.8 | 1.8 | 3.5 |
| [C] Epoxy Compound | — | 2021P | 2021P | 2021P |
| (amount used, ppm) | — | 300 | 300 | 300 |
| [D] Phosphorus Compound | — | — | TDBPP | TDBPP |
| (amount used, ppm) | — | — | 300 | 300 |
| Initial properties | | | | |
| IV (dL/g) | 0.49 | 0.49 | 0.49 | 0.49 |
| YI | 1.67 | 1.68 | 1.54 | 1.86 |
| Light transmittance (%) | 90.8 | 90.8 | 90.8 | 90.8 |
| Haze | 0.2 | 0.2 | 0.2 | 0.2 |
| MFR (g/10 min) | 10.3 | 10.4 | 10.5 | 10.4 |
| Residence stability | | | | |
| YI | 1.85 | 1.89 | 1.64 | 1.98 |
| MFR (g/10 min) | 11.0 | 11.2 | 11.2 | 11.3 |
| MFR rise (%) | 7 | 8 | 7 | 9 |
| Water resistance | | | | |
| Haze | 5.4 slightly cloudy | 4.2 slightly cloudy | 5.3 slightly cloudy | 11.3 slightly cloudy |

| | Reference Example 5 | Reference Example 6 | Reference Example 7 | Reference Example 8 |
|---|---|---|---|---|
| Catalyst | | | | |
| 1) NaOH amount, $10^{-7}$ mol/BPA) | 40.0 | 0.2 | 4.0 | 50.0 |
| 2) Me₄NOH amount ($10^{-4}$ mole/BPA) | 2.5 | 2.5 | 2.5 | 2.5 |
| Additive | | | | |
| [B] Compound | BTS | BTS | BTS | BTS |
| (amount used, ppm) | 7.0 | 0.1 | 15.0 | 100.0 |
| [C] Epoxy Compound | 2021P | — | — | — |
| (amount used, ppm) | 300 | — | — | — |
| [D] Phosphorus Compound | TDBPP | — | — | — |
| (amount used, ppm) | 300 | — | — | — |
| Initial properties | | | | |
| IV (dL/g) | 0.49 | 0.28 | 0.49 | 0.49 |
| YI | 2.10 | NM | 1.42 | 2.90 |
| Light transmittance (%) | 90.7 | — | 90.9 | 90.7 |
| Haze | 0.3 | — | 0.2 | 0.3 |
| MFR (g/10 min) | 10.3 | >100 | 10.4 | 10.3 |
| Residence stability | | | | |
| YI | 2.43 | — | 1.65 | 3.15 |
| MFR (g/10 min) | 12.1 | — | 10.9 | 11.4 |
| MFR rise (%) | 17 | — | 5 | 11 |
| Water resistance | | | | |
| Haze | 83.4 cloudy | — | 93 cloudy | 98 cloudy |

BTS = butyl p-toluenesulfonate;
2021P = "Celoxide" 2021P
TS = p-toluenesulfonic acid;
TDBPP = tris(2,4-di-t-butylphenyl)phosphite;
C = colorless;
T = transparent;
TC = tiny cracks;
NC = no cracks)
NT = not moldable

We claim:

1. A method for preparing polycarbonates, which method comprises inducing the melt polycondensation of an aromatic dihydroxy compound and a diester carbonate in the presence of a total amount in the reaction system of $5 \times 10^{-8}$ to $8 \times 10^{-7}$ mole of alkali metal compounds or alkaline earth metal compounds per mole of the aromatic dihydroxy compound, and adding to the polycarbonate which is the reaction product thereof:

a sulfonic acid compound having the formula

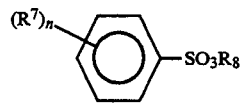

where $R^7$ is a hydrocarbon group having 1–6 carbons in which the hydrogens may be substituted with halogens $R^8$ is a hydrocarbon group with 1–8 carbons in which the hydrogens may be substituted with halogens and n is an integer from 0 to 3 in an amount of 0.05–10 ppm, based on the polycarbonate, and an epoxy compound in an amount of 1–2000 ppm, based on the polycarbonate.

2. A method for preparing polycarbonates according to claim 1, whereby the epoxy compound [C] is used in an amount of 1–1000 ppm, based on the polycarbonate.

3. A method for preparing polycarbonates according to claim 1, whereby the epoxy compound [C] is an alicyclic epoxy compound.

4. A method for preparing polycarbonates according claim 1, whereby the epoxy compound [C] is 3,4-epoxycyclohexylmethyl-3',4'-epoxycyclohexylcarbonate.

* * * * *